United States Patent [19]

Rehder

[11] 4,071,882
[45] Jan. 31, 1978

[54] STRUCTURE FOR ELECTRICAL INTERFACE

[75] Inventor: Robert Henry Rehder, Peterborough, Canada

[73] Assignee: Canadian General Electric Co., Ltd., Toronto, Canada

[21] Appl. No.: 744,893

[22] Filed: Nov. 24, 1976

[30] Foreign Application Priority Data

June 16, 1976 Canada .................................. 254998

[51] Int. Cl.² ........................ H02B 1/20; H02B 5/00; H02G 5/06; H02G 7/00
[52] U.S. Cl. ...................................... 361/333; 174/43; 174/71 B; 174/100; 307/147; 361/378
[58] Field of Search ..................... 174/40 R, 43, 45 R, 174/70 B, 71 B, 72 B, 99 B, 100; 307/147; 361/332, 333, 341, 342, 378

[56] References Cited

U.S. PATENT DOCUMENTS

| 1,756,865 | 4/1930 | Huber et al. | 361/333 |
| 2,275,203 | 3/1942 | Rudd | 174/71 B X |
| 2,548,566 | 4/1951 | Stafford | 174/99 B X |
| 3,639,673 | 2/1972 | Fujisaki et al. | 174/100 X |

*Primary Examiner*—Laramie E. Askin
*Attorney, Agent, or Firm*—William Freedman

[57] ABSTRACT

In an electrical substation, the use of separate towers or poles to terminate overhead lines is obviated by using bus duct for this purpose. Isolated phase or metal-clad bus duct is erected to provide not only the electrically conductive path between the overhead lines and the associated electrical equipment, but also the mechanical strength necessary in order to eliminate the towers and poles of the prior art.

9 Claims, 7 Drawing Figures

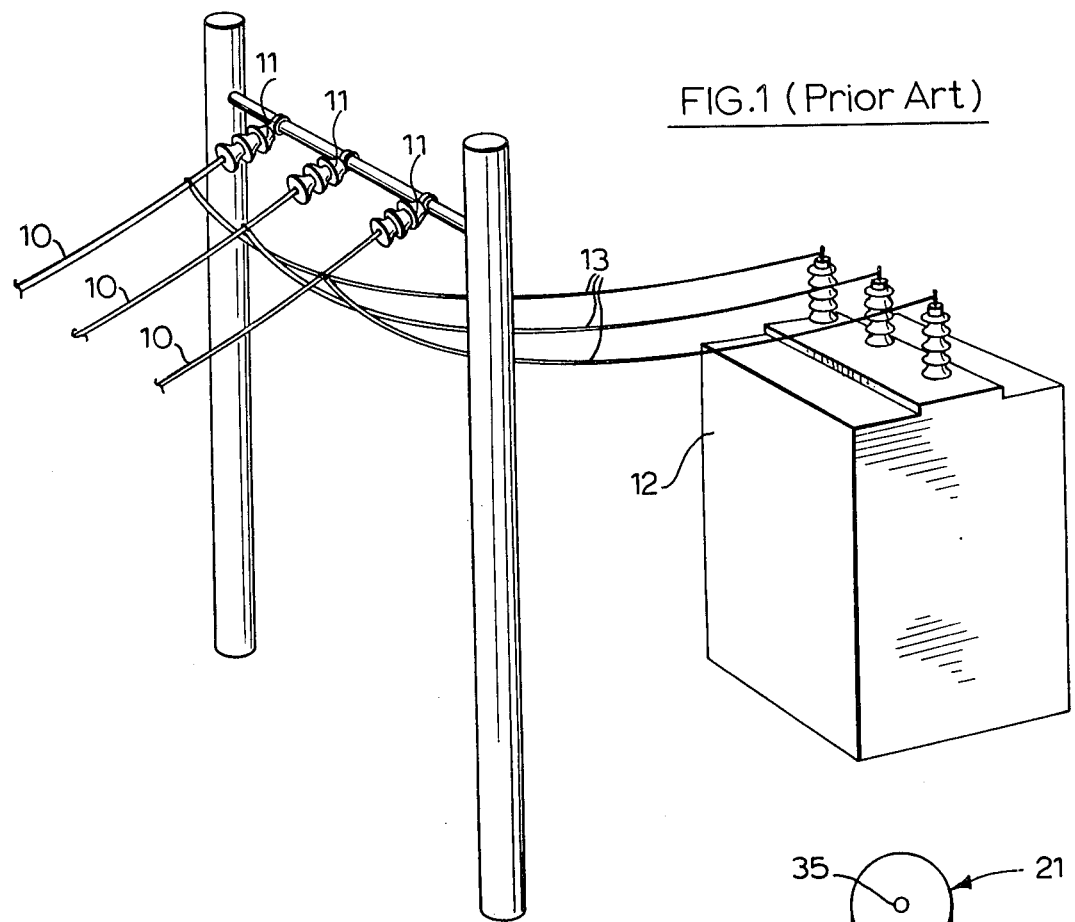
FIG. 1 (Prior Art)
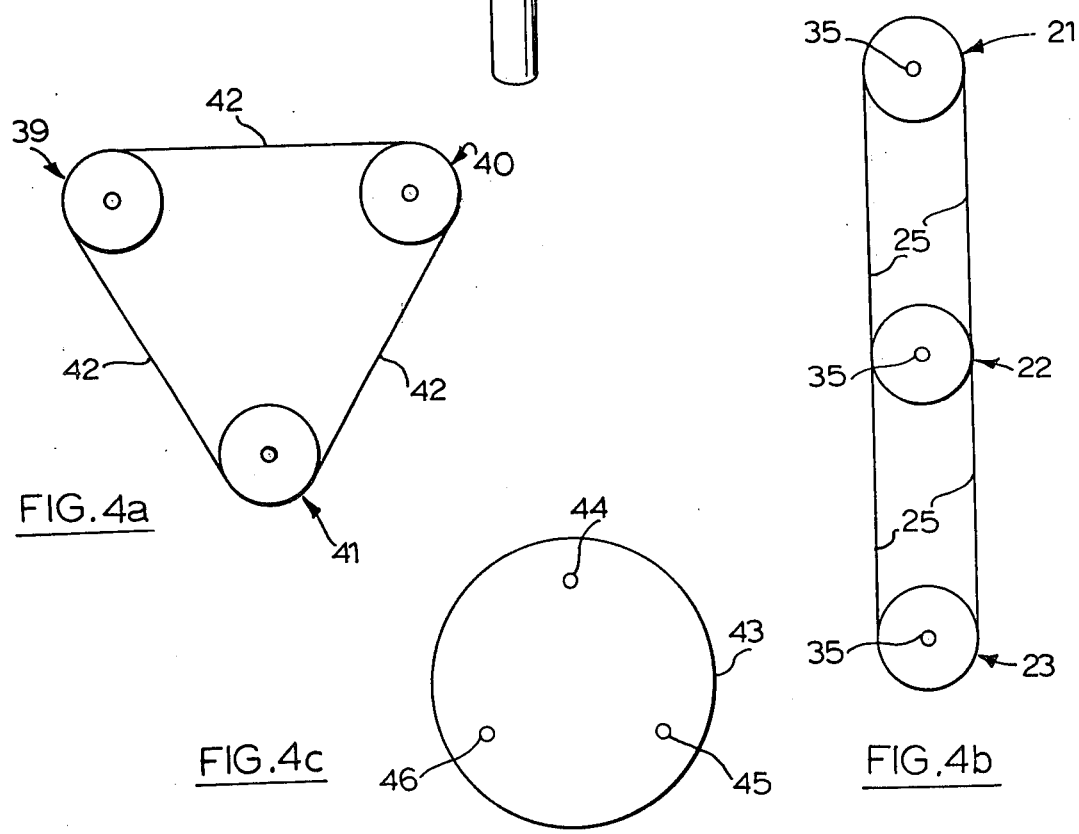
FIG. 4a
FIG. 4b
FIG. 4c

STRUCTURE FOR ELECTRICAL INTERFACE

BACKGROUND

This invention relates to electric power distribution systems, and more particularly, to interfaces between overhead electrical distribution lines and electrical equipment.

Present interfaces employ poles or towers to terminate overhead lines or conductors. Electrical cables, supported by these poles or towers, are used to connect the overhead lines with associated electrical equipment such as transformers or switchgear. In smaller installations this associated equipment may be located on the pole or tower itself, but in larger installations such equipment is usually located on ground level.

With the use of such prior art interface devices, much of the equipment such as bus bars, disconnects, fuses, etc. is open to the elements and a fence around such an installation is required to prevent people from coming into contact with objects such as conductors, etc. having an electric potential. When towers of the type that employ metal lattice work are used, a fence is commonly required to discourage people from climbing the towers.

An additional drawback to the use of towers is the fact that they can be costly to install, they generally are not very aesthetic, and they frequently occupy considerable space.

Also known in the electrical art is the use of metal-clad bus duct and isolated phase bus duct to interconnect pieces of electrical equipment. Briefly stated, isolated phase bus duct comprises a conductor, a generally cylindrically-shaped metal enclosure, or duct, at ground potential surrounding the conductor, and means insulating the conductor from the enclosure. One such bus duct is used for each phase of an electrical system, thereby isolating the phases from each other, and thus the name isolated phase bus duct. Metal-clad bus duct is somewhat similar in that it also has a generally cylindrically-shaped grounded metal enclosure, but it differs in that it has three conductors, insulated from each other, contained inside the single metal enclosure, one conductor for each phase. In a typical installation, the bus duct is supported at various points along its length, as is well known in the prior art.

In the prior art, the overhead lines of a power distribution system are terminated at towers (or poles) and flexible cables or conductors are used to connect the overhead lines to the associated electrical equipment. This associated electrical equipment is then connected to other electrical equipment by various means, including the aforementioned isolated phase bus duct and the metal-clad bus duct.

The present invention obviates the use of separate towers or poles as hereinbefore described, by employing the aforementioned isolated phase or metal-clad bus duct to provide not only the electrically conductive path between the overhead lines and the associated electrical equipment, but also the mechanical strength necessary in order to eliminate the towers and poles of the prior art.

SUMMARY

In carrying out the invention in one form, I provide an electrical interface device for interfacing at least one overhead electrical distribution line with electrical equipment, the interface device comprising: at least one generally-cylindrical vertical column of grounded metal arranged to be supported from its lower extremity, with its longitudinal axis approximately vertical. At least one generally vertically-extending conductor is located inside the vertical column and is insulated therefrom. Means extends into the column adjacent the upper end of the column for electrically connecting said distribution line to said conductor at the upper end of the conductor. At a location intermediate the ends of the column and projecting laterally from said conductor, there is provided generally horizontal cnductive means for electrically connecting said conductor to said electrical equipment. A generally horizontally-extending tubular metal enclosure located intermediate the ends of the vertical column surrounds the horizontal conductive means immediately adjacent said vertical column.

BRIEF DESCRIPTION OF THE DRAWINGS

The invention will now be described in more detail with reference to the accompanying drawings, in which:

FIG. 1 is a simplified perspective drawing of a prior art substation;

FIGS. 4a, 4b and 4c depict simplified plan views of three different embodiments of the present invention.

DETAILED DESCRIPTION OF PREFERRED EMBODIMENTS

FIG. 1 is a simplified perspective view of a prior art substation. As can be seen from FIG. 1, the overhead lines 10 are terminated by strain insulators 11. A transformer 12 is shown resting on the ground surface and is connected to the lines 10 by cables 13. A fence (not shown) would normally enclose such a substation.

Figure 2:
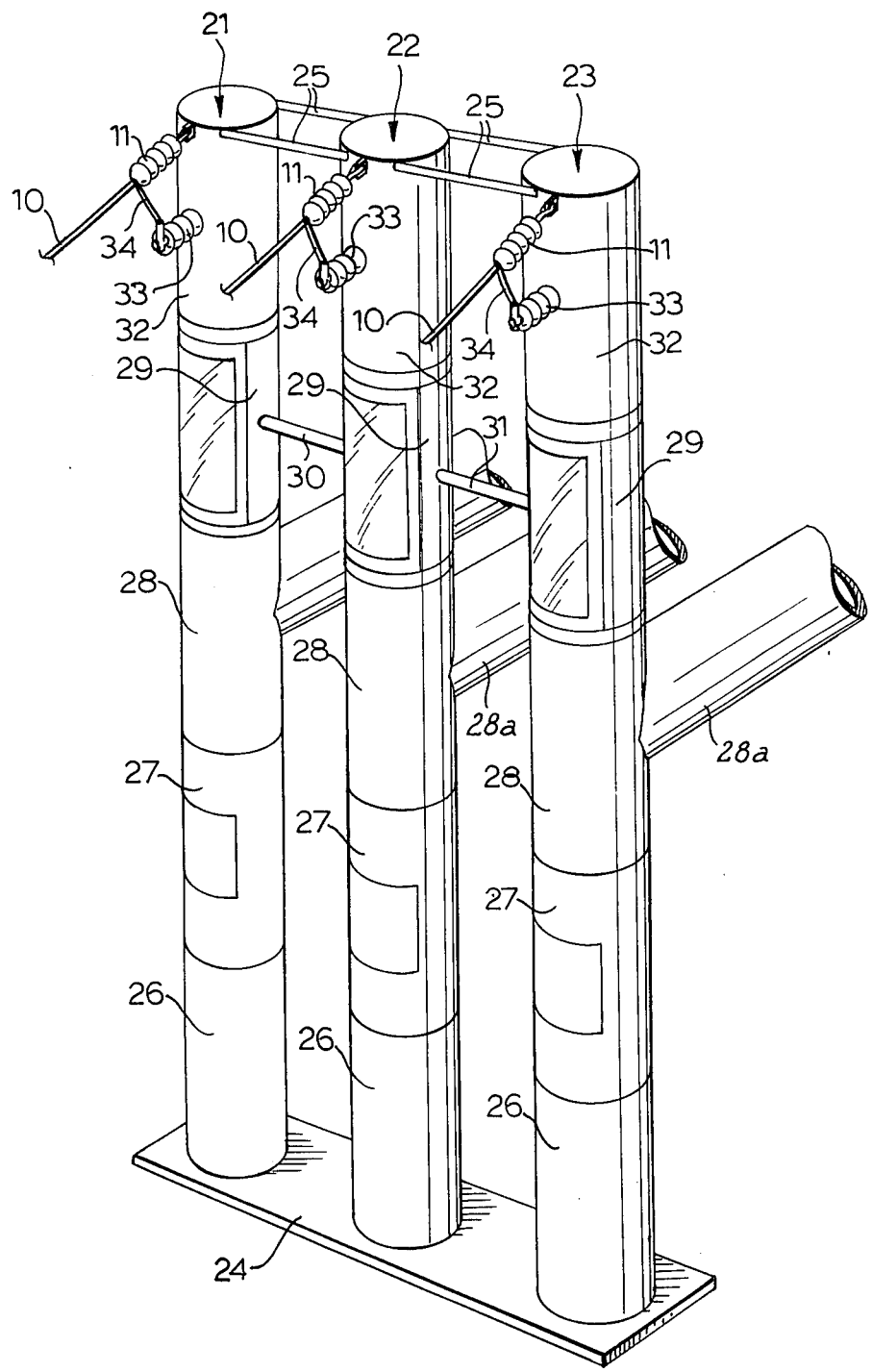
FIG. 2 is a simplified perspective view of a preferred embodiment of the present invention.

FIG. 2 depicts a preferred embodiment of the present invention shown in a three-phase application. As before, overhead lines 10, one for each phase, are terminated by strain insulators 11. The mechanical support for the insulators 11 is now provided by isolated phase bus ducts 21, 22 and 23, shown in FIG. 2. These bus ducts comprise vertical columns in the form of cylindrical metal ducts at ground potential mounted with their longitudinal axes in an approximately vertical orientation. A base plate 24 is located at the lower end of the vertical columns of the bus ducts 21, 22 and 23 and support bars 25 are attached, as shown in FIG. 2, to the upper portion of the vertical columns of the bus ducts 21, 22 and 23 to help provide support therefor.

In the preferred embodiment shown in FIG. 2, each isolated phase bus duct 21, 22 and 23 is comprised of several modular units or modules. This type of construction allows a wide variety of installations to be created from a relatively small variety of standard bus duct modules.

The lower module in each bus duct 21, 22 and 23 is a base module 26 comprising a hollow cylinder welded to the base plate 24 in order to transfer mechanical load and to provide vertical spacing for the next module. The next module directly above module 26 is a lightning arrestor module 27. Lightning arrestor module 27, as the name implies, contains a lightning arrestor located in the bus duct module 27 in a manner well known in the bus duct art. The next module, located directly above module 27, is a "T" module 28. "T" module 28 provides an electrical connection both to the lightning arrestor module 27 and to the associated electrical equipment (not shown) that is to be supplied with power from the lines 10. This equipment is located adjacent the vertical columns. Situated directly above the "T" module 28 is the circuit breaker module 29. The circuit breaker module 29, as suggested by its name, contains a circuit breaker. Connecting rods 30 and 31 interconnect the three circuit breaker modules 29 so that they operate in unison.

Situated directly above the circuit breaker modules 29 are the terminal modules 32. The terminal modules 32 constitute the uppermost portions of the bus ducts 21, 22 and 23. The top of each module 32 is closed, as can be seen from the Figure, and each module 32 supports a strain insulator 11 to which the overhead lines 10 are connected. A bushing 33 is attached to each module 32, and a conductor 34 connects each line 10 to the usual terminal at the outer end of a corresponding bushing 33 as shown in FIG. 2. There is a conductor (not shown in FIG. 2) located inside the duct of each bus duct 21, 22 and 23 (as is well known in the bus duct art) to which the inner end of the usual conductor of the bushing 33 is electrically connected.

Each module, as shown in FIG. 2, is approximately 6 feet high, thus giving an overall height of approximately 30 feet for the vertical column of the preferred embodiment illustrated. If additional height is desired, extra modules (not shown) which comprise simply straight sections of bus duct (i.e., no circuit breakers, etc.) can be inserted as desired into the structure shown in FIG. 2 to give the height and characteristics desired.

The dimensions of the structure will depend both upon the voltage it is to handle and upon the mechanical loading it is to withstand. The loading factors will include the pull of the overhead lines 10, wind velocities, and the height of the bus ducts 21, 22 and 23. For the installation shown in FIG. 2, the outer diameter of the bus ducts 21, 22 and 23 is 36 inches, the duct walls are ⅛ inch thick, and the bus ducts 21, 22 and 23 are located approximately 50 inches apart, centre to centre. The size of the conductor (not shown) located inside the bus duct 21, 22 and 23 depends, of course, on the current rating of the bus ducts. The voltage rating of the embodiment shown in FIG. 2 is 34.5 kV; this voltage rating will of course vary depending upon the spacing between lines 10 and upon the diameter of the bus ducts 21, 22 and 23. Ideally the bus ducts 21, 22 and 23 will be as nearly identical as possible.

Figure 3A:
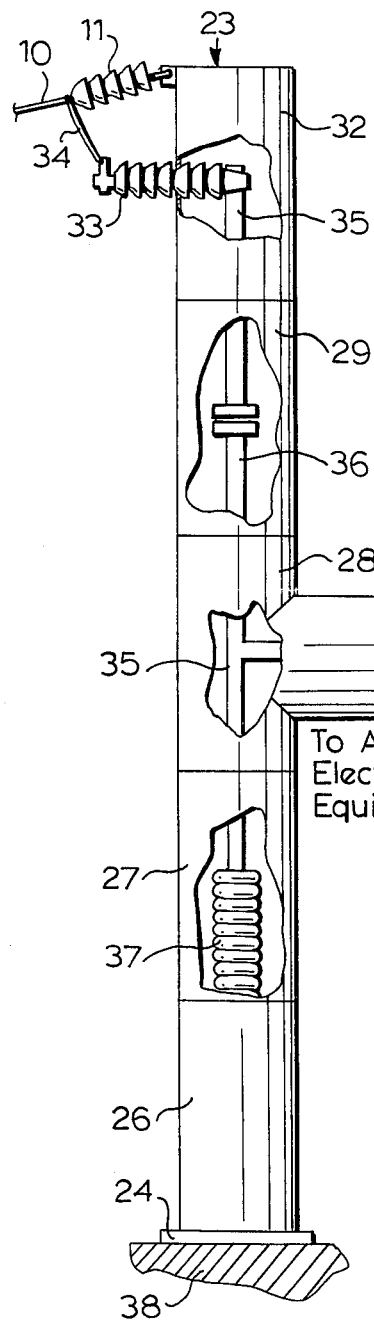
FIGS. 3a and 3b are sectional views of the side and front, respectively, of the embodiment shown in FIG. 2.
Figure 3B:
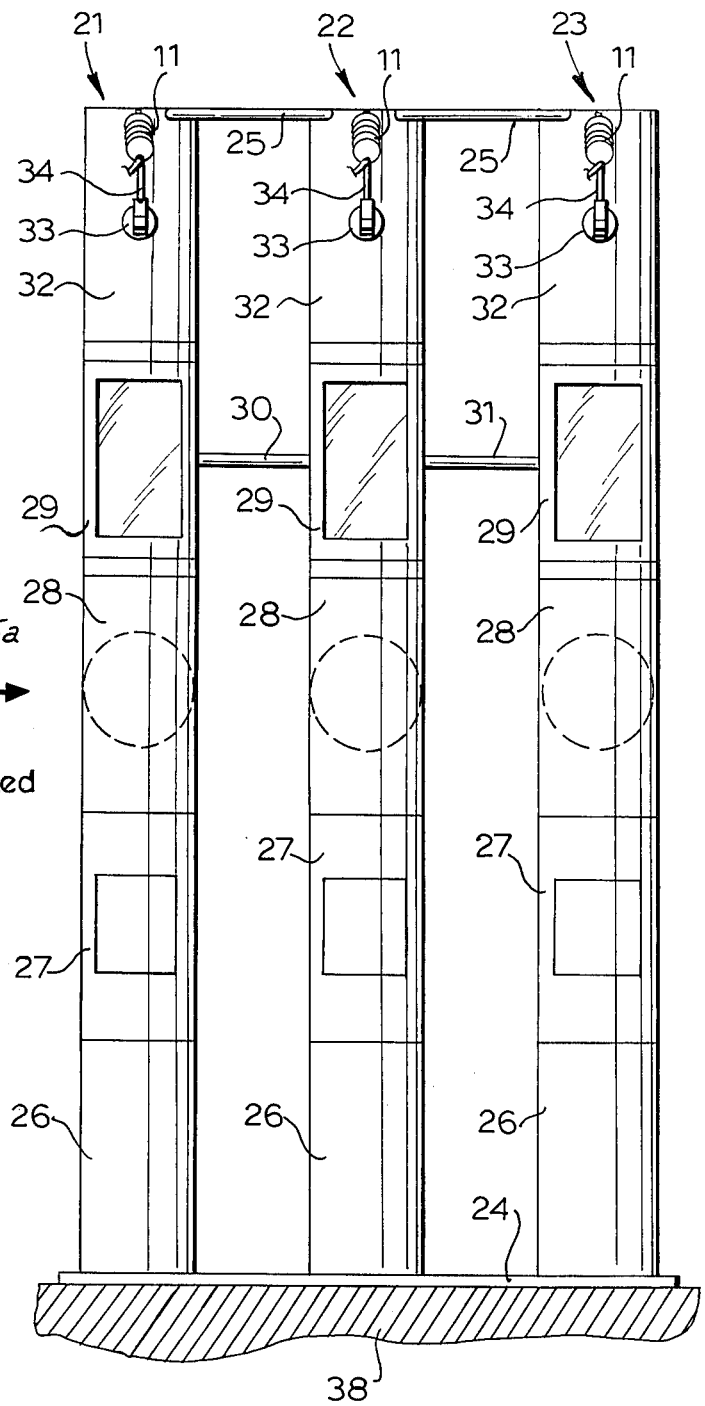

FIG. 3a is a side view of the embodiment shown in FIG. 2, showing bus duct 23 cut away in certain locations to better illustrate its construction. FIG. 3b is a front view of the embodiment shown in FIG. 2. Referring to both FIGS. 3a and 3b, it can be seen that lines 10 (not shown in FIG. 3b) are terminated at strain insulators 11 which are in turn supported by the bus ducts 21, 22 and 23. Conductors 34 join the lines 10 to the bushings 33 carried by the terminal modules 32 of each bus duct. As seen in FIG. 3a, there is a conductor 35 inside module 32, as positioned approximately coaxial therewith, to which the usual conductive stud of bushing 33 makes electrical contact. This conductor 35 is continued through the modules 29 and 28 of the bus duct 23 in a manner well known in the bus duct art.

Below terminal modules 32 are located the circuit breaker modules 29, each one of which contains a circuit breaker 36, as shown in simplified form in FIG. 3a. As shown in FIG. 3b, each module 29 is interconnected by connecting rods 30 and 31 to enable all the circuit breaker modules 29 to operate in unison.

Next, below modules 29 are the "T" modules 28, which provide an electrical connection both to the associated electrical equipment (not shown) located adjacent the vertical columns and to the lightning arrestor modules 27. Typical associated electrical equipment would include transformers, switchgear, bus duct, etc. The connection to such associated equipment is through a horizontal conductor 35a projecting laterally from the vertical conductor 35 and surrounded by the horizontal tubular portion 28a of "T" module 28 immediately adjacent the vertical column. The lightning arrestor modules 27, as the name implies, contain lightning arrestors 37, one of which is shown, in simplified form in FIG. 3a. It will be noted that the "T" modules 28 are at locations intermediate the ends of each vertical column. The horizontally-extending components 28a and 35a likewise are located intermediate the ends of the vertical column.

Below the modules 27 are situated the base modules 26 which are connected to the base plate 24. The base modules 26 provide for an electrically conductive path between the lightning arrestors 37 and the ground, indicated generally by the numeral 38.

As well as providing their electrical function, as outlined above, each of the modules 26, 27, 28, 29 and 32 provides mechanical strength for the structure. Additional strength and support is provided by the support bars 25 and by the base plate 24. In the preferred embodiment shown in FIGS. 2 and 3b, the spacing between the centers of adjacent bus ducts 21, 22 and 23 is approximately 50 inches. This spacing can be varied depending upon the spacing of the overhead lines 10.

While the foregoing has been a description of the preferred embodiment of the present invention for one particular application, various modifications can be made to the preferred embodiment while remaining within the scope of the present invention. Some of these modifications will now be discussed briefly.

FIGS. 4a, 4b and 4c depict the plan views of three different installations employing the present invention. FIG. 4b is a simplified plan view of the preferred embodiment as depicted in FIG. 2. FIG. 4b shows the vertical columns of bus ducts 21, 22, and 23 arranged in a straight line or linear configuration. The support bars 25 are shown, as are the conductors 35.

FIG. 4a is a simplified plan view of an alternative layout for the vertical columns of the isolated phase bus ducts indicated generally by the numerals 39, 40 and 41. As can be seen from FIG. 4a the vertical columns of bus ducts 39, 40 and 41 are situated so as to form a generally triangular shape or configuration. Support bars 42 are used to brace the ducts 39, 40 and 41 in the same manner as support bars 25 are employed in the preferred embodiment of FIG. 2. The bus ducts 39, 40 and 41 of FIG. 4a are identical to bus ducts 21, 22, and 23 of FIG. 2. Bus ducts 39, 40, 41 may be made higher by the use of additional modules containing solely a conductor such as conductor 35 of FIG. 3a and the relationship of the modules to one another can be varied to suit the particular applicaton, and modules may be repeated or duplicated within the same bus duct, if desired.

FIG. 4c depicts the simplified plan view of a modification of the preferred embodiment using metal clad bus duct 43 rather than isolated phase bus duct as in FIG. 2. Metal clad bus duct 43 differs from isolated phase bus duct in that the conductors 44, 45, and 46 (one for each phase) are all contained within a single metal enclosure. In the isolated phase bus duct there is a single conductor inside each enclosure, and consequently three isolated phase bus ducts are required for a three phase system. With the metal clad bus duct 43 as shown in FIG. 4c, only one bus duct is needed for a three phase system.

Another modification that can be made to any of the embodiments shown in FIGS. 2, 4a and 4c is to use guy wires or rigid bracing to provide additional support for the structure. While this is not preferred, it may sometimes be necessary.

The foregoing has been a description of the preferred embodiment, as well as variations thereof, as envisioned by the inventor. It is to be understood that the dimensions as given in this specification are for one application of the invention only, and different dimensions can be employed depending upon the particular circumstances. Accordingly, the dimensions given herein should not be considered as a limitaion of the invention in any manner whatsoever, but rather, considered soley as examples for illustrative purposes.

While I have shown and described a particular embodiment of my invention, it will be obvious to those skilled in the art that various changes and modifications may be made without departing from my invention in its boarder aspects; and I, therefore, intend herein to cover all such changes and modifications as fall within the true spirit and scope of my invention.

What I claim as new and desire to secure by Letters Patent of the United States is:

1. An electrical interface device for interfacing at least one overhead electrical distribution line with electrical equipment, said interface device comprising:
   a. at least one generally-cylindrical vertical metal column adapted to be at ground potential,
   b. means for supporting said column from its lower extremity in a position adjacent to electrical equipment, with the longitudinal axis of said column approximately vertical;
   c. at least one generally vertically-extending conductor located inside said column and insulated therefrom,
   d. means extending into said column adjacent the upper end of the column for electrically connecting an overhead distribution line to said conductor at the upper end of said conductor,
   e. generally-horizontal conductive means projecting laterally from said conductor through said metal column at a location intermediate the ends of said column for electrically connecting said conductor to electrical equipment, and
   f. a generally horizontally-extending tubular metal enclosure located intermediate the ends of said vertical column and surrounding said horizontal conductive means immediately adjacent said vertical column.

2. The interface device of claim 1 wherein:
   a. said vertical column comprises a plurality of vertically-stacked modules, one of which is a base module supporting the other modules, another of which is a lightning arrestor module mounted atop said base module, another of which is a "T" module mounted atop said lightning arrestor module, another of which is a circuit breaker module mounted atop said "T" module, and another of which is a terminal module mounted atop said circuit breaker module,
   b. and said horizontally-extending enclosure constitutes a portion of said "T" module.

3. The interface device of claim 2 wherein there are three generally cylindrical vertical columns each constructed as set forth in claim 2 located in spaced side-by-side relationship.

4. The interface device of claim 2 in combination with a strain insulator attached to said terminal module for supporting an overhead line on said vertical column.

5. The interface device of claim 1 wherein there are three generally- cylindrical vertical columns located in spaced side-by-side relationship.

6. The interface device of claim 5 wherein said three vertical columns are arranged in a linear configuration.

7. The interface device of claim 5 wherein said three vertical columns are arranged in a triangular configuration.

8. The interface device of claim 1 wherein there are three vertically- extending conductors located inside said vertical column, insulated from said vertical column and from each other.

9. The interface device of claim 1 in combination with a strain insulator attached to said vertical column for supporting an overhead line on said vertical column.

* * * * *